United States Patent [19]

Saito

[11] 3,988,750
[45] Oct. 26, 1976

[54] EXPOSURE TIME INDICATING DEVICE FOR CAMERA SHUTTER
[75] Inventor: Takeo Saito, Chiba, Japan
[73] Assignee: Seiko Koki Kabushiki Kaisha, Japan
[22] Filed: May 13, 1975
[21] Appl. No.: 577,079

Related U.S. Application Data
[63] Continuation of Ser. No. 362,796, May 22, 1973, abandoned.

[30] Foreign Application Priority Data
May 22, 1972 Japan.............................. 47-49861

[52] U.S. Cl.............................. 354/51; 354/60 R
[51] Int. Cl.²........................................ G03B 7/08
[58] Field of Search............. 354/50, 51, 60 R, 60 E

[56] References Cited
UNITED STATES PATENTS

| | | | |
|---|---|---|---|
| 3,651,744 | 3/1972 | Okada.................................. | 354/51 |
| 3,675,548 | 7/1972 | Kikuchi et al. ...................... | 354/51 |
| 3,750,540 | 8/1973 | Yanagisawa et al.............. | 354/51 X |

Primary Examiner—Joseph F. Peters, Jr.
Attorney, Agent, or Firm—Robert E. Burns; Emmanuel J. Lobato; Bruce L. Adams

[57] ABSTRACT

An exposure time indicating apparatus for a camera shutter having a switching circuit that has a switching level which is compensated for the brightness of an object or field of exposure. The apparatus includes an indicating circuit that indicates the exposure time. The signal developed to indicate the exposure time takes into consideration exposure factors other then the delay for variaions in brightness, for control of exposure time. This other factor is introduced by camera adjustments which effect automatically adjustment of a variable resistor as a function of the exposure factor being adjusted and this resistor varies a bias voltage on a transistor of a differential amplifier for varying the output thereof to apply a variation to a switching circuit controlling the shutter to change its switching level and the switching signal closing the shutter. This varied and time-delayed signal is visually indicated in a meter as the actual exposure time before the taking of an exposure.

4 Claims, 4 Drawing Figures

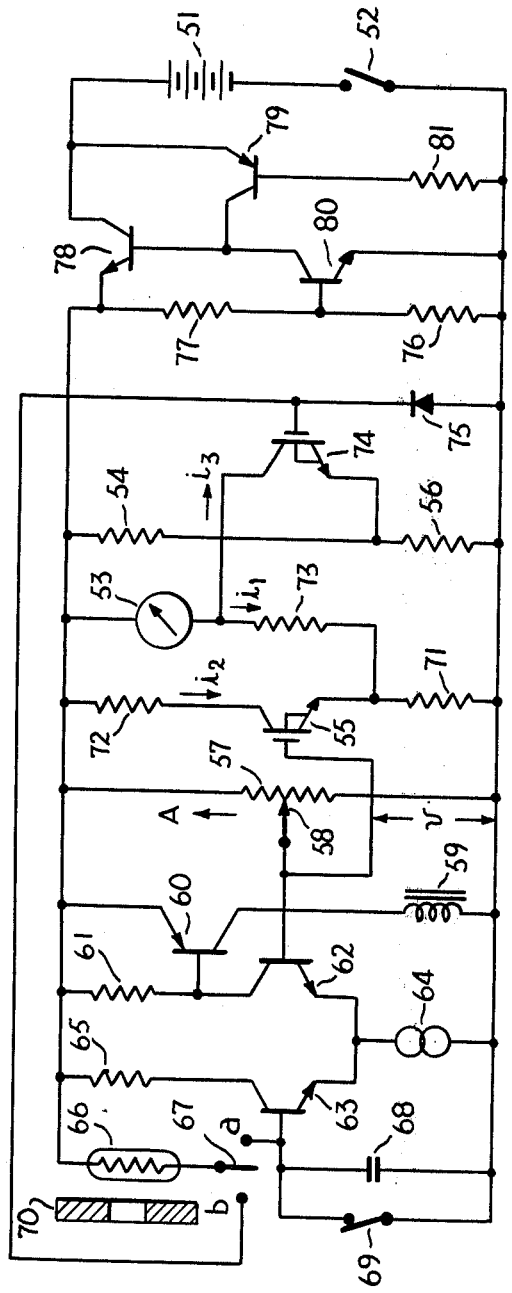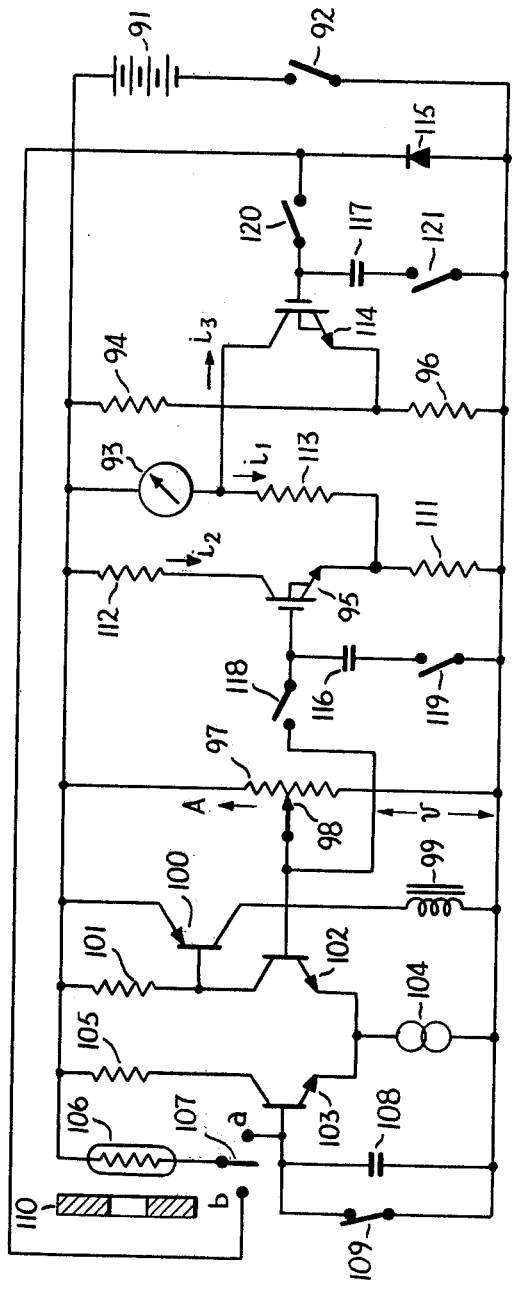
FIG. 3
FIG. 4

1

EXPOSURE TIME INDICATING DEVICE FOR CAMERA SHUTTER

This is a continuation of application Ser. No. 362,796, filed May 22, 1973, now abandoned.

BACKGROUND OF THE INVENTION

This invention relates generally to photography cameras and more particularly to an exposure time indicating apparatus that controls a shutter automatically compensated for brightness and another photography variable.

Electronically controlled shutters have the exposure time automatically controlled. The exposure time is not known to the camera operator. If other variables or exposure factors, such as settings for film sensitivity, iris and exposure multiple, are to be set variation of exposure time should be taken into consideration but it is not in the known exposure time control circuits. The other factors affecting the exposure are set by other elements in the camera and as a consequence photographic exposures are often not adequate.

However, apparatus for changing the switching level of a switching circuit in control circuitry for a camera shutter by compensating for other photography variables is known. The setting for this other variable may require to adjust an element, controlling the other variable, with relation to the position of a pointer of an indicator that indicates exposure delay time. This type of adjustment of the complete exposure time results in inaccuracies in the setting thereof.

SUMMARY OF THE INVENTION

It is a principal object of the present invention to provide an apparatus that controls automatically a shutter exposure time compensated or taking into consideration the brightness of the object being photographed and some other photography variable or factor.

Another object is to provide an exposure time indicating apparatus that accurately indicates visually exposure time before taking of a photograph.

The apparatus for accurately indicating visually to the user of a camera the exposure time has means comprising a photoconductive element for developing a switching signal that takes into consideration the brightness of the object being photographed. A switching circuit receives the switching signal and controls the shutter accordingly. The switching circuit level is varied by the apparatus which has means to take into consideration another photography factor that results in the introduction of a resistance variation of a resistor that varies a bias voltage to a differential amplifier. A change-over switch is provided for connecting the photoconductive element to an indicating circuit that visually indicates the exposure time as a function of the delay time necessary for the brightness level and the exposure factor that is being taken into consideration.

BRIEF DESCRIPTION OF THE DRAWINGS

Other features and advantages of the exposure time indicating apparatus in accordance with the present invention will be better understood as described in the following specification and appended claims, in conjunction with the following drawings in which:

FIGS. 2, 3 and 4 are schematic diagrams of three other embodiments of an apparatus according to the invention.

DESCRIPTION OF THE PREFERRED EMBODIMENTS

Figure 1:
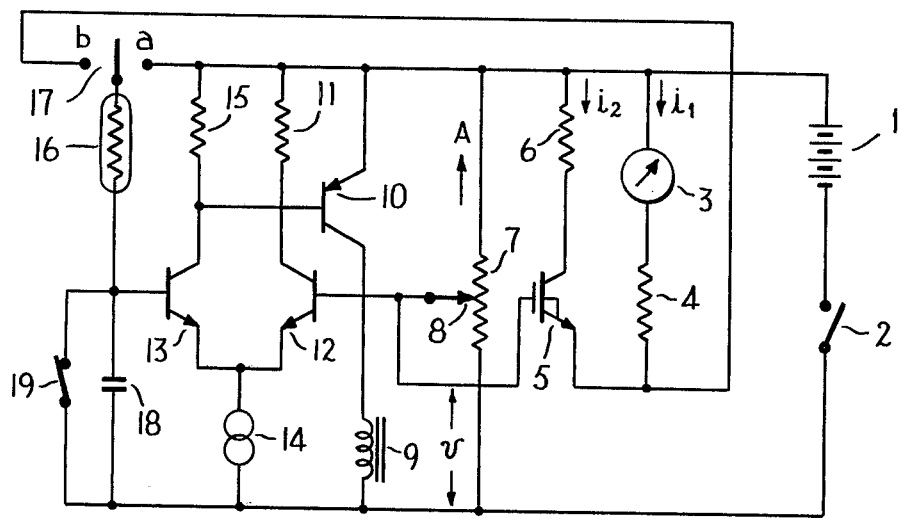
FIG. 1 is a schematic of an apparatus according to the invention.

As illustrated in FIG. 1 an exposure time indicating apparatus embodying the invention has a power source 1 to which is connected a power switch 2 and across which meter means including an ammeter 3 in series with a resistor 4 in parallel with a field effect transistor 5 and a resistor 6. The meter, the field effect transistor and the two resistors 4, 6 form an exposure time indicating circuit.

A variable resistor 7 with a movable contact 8 is connected across the power source 1 for variably making settings corresponding to another exposure factor. For example the movable contact 8 may be connected to an iris setting part, not shown, which would move the movable contact in the direction of an arrow A when reducing the iris. An electromagnet 9 for closing the shutter blades, now shown, is connected in series with an amplifier transistor 10 across the power source in parallel with the variable resistor 7 as part of a switching circuit for controlling the shutter exposure time. A differential amplifier in the switching circuit comprises two transistors 12, 13, a constant voltage source 14, and two resistors 11, 15 connected across the power source 1.

A time delay circuit is provided as a photoconductive element 16 sensing the brightness of a field of exposure in series with a movable contact 17 of a change-over switch and a storage capacitor 18 across the power source. A timing switch 19 is connected parallel to the capacitor.

An input end of the differential amplifier has the base of one of its transistors 13 connected to a connecting point between the photoconductive element 16 and the capacitor 18. The collector of transistor 12 is connected to the amplification transistor 10 whose collector is connected to the electromagnet 9 for controlling the shutter closing. The other input end has the base of its other transistor 12 connected to the movable contact 8 of the variable resistor 7 for supplying a bias voltage. The gate of the field effect transistor 5 is connected to a connecting point between the transistor 12 and the contact piece 8.

The movable contact of the change-over switch 17 is connected to one end of the photoconductive element. When the movable contact engages with a fixed contact *b* the photoconductive element 16 is connected to the field effect transistor 5 and to the ammeter 3 through its series resistor 4. In order to open and close the shutter the change-over switch 17 is actuated to close with the other fixed contact *a*, then the shutter is open mechanically, as later explained. At the same time the timing switch in parallel with the capacitor is opened and this actuates the differential amplifier and the shutter is closed by controlling the electromagnet 9.

The operation is as follows: when the camera release lever, now shown, is actuated, for example downwardly, to take a photographic exposure the main or power switch 2, which is normally open, is closed to apply the voltage of the power source 1 to the control circuitry. At the same time the change-over switch contact *b* is closed. Since the base of the differential amplifier transistor 13 is connected to one side of the power source by the timing switch 9, there occurs a reverse bias to make this transistor 13 nonconductive, while the other differential amplifier transistor 12 becomes conductive because a bias voltage $v$ is developed by the variable resistor 7. On the other hand, since the gate of the electric field effect transistor 5 is connected to the base of the other differential amplifier transistor 12, a voltage equal to the bias voltage is impressed there. This bias voltage $v$ controls not only the current passing through this other transistor 12 to determine the switching level for setting the actual shutter opening and closing time, but also a current $i_2$ flowing between the drain and the source of the field effect transistor 5 through its series resistor 6. The current $i_2$ obtained here is a current that is proportional to the bias voltage $v$. On the other hand, since the indicating meter 3 is connected in parallel with the field effect transistor 5 through its series resistor 4, a current $i_1$ that is related to the current $i_2$ in an inverse proportion begins to flow. Moreover, since the photoconductive element 16 is connected to the connecting point between the series resistor 4 and the source of the field effect transistor 5 through the change-over switch 17, and connected to one side of the electric source 1 through the timing switch 19, the current $i_1$ is controlled in an inverse proportion to the resistance value of the photoconductive element 16. The photoconductive element is light-responsive and its conductance or resistance varies in response to the brightness of the object being photographed. In this way the current $i_1$ that is controlled by both of the bias voltage to determine the switching level of the differential amplifier and the resistance value of the photoconductive element 16 flows through the meter 3, whereby the exposure time is indicated.

As the movement of the release lever continues the change-over switch 17 is turned from the contact $b$ to the contact point $a$, and the photoconductive element 16 is placed in series with the capacitor 18. When the shutter blade begins to open by the action of a shutter blade opening part, not shown, the timing switch 19 is opened and the capacitor 18 starts its charging through and under control of the photoconductive element 16. Since, in this case, the input impedance of the field effect transistor 5 is very high, the bias voltage $v$ is not affected at all. When the charging voltage of the capacitor 18 exceeds the value of the sum of the voltage at both ends of the contant current source 14 to be determined by the bias voltage $v$ and the voltage between the base and the emitter of the transistor 13, the transistor 13 is abruptly brought into a conductive state, exciting the electromagnet 9 and attracting the blade closing part, not shown, closing the shutter thereupon the photographic exposure is completed.

Suppose that we want to obtain a long exposure time by reducing the iris aperture and moving an iris setting part, not shown, in the direction required, then the movable contact 8 of the variable resistor 7 is moved in the direction of the arrow A, and the bias voltage $v$ applied to the base of the transistor 12 is raised. As the bias of the gate of the electric field effect transistor 5 is necessarily elevated simultaneously, the resistance between the drain and the source thereof is decreased and the current $i_2$ flowing through the resistance 6 is increased. Therefore, the current $i_1$ flowing through the indicating meter 3 is decreased, making the deflection angle of the meter lessened to indicate a longer exposure time. Since the bias voltage $v$ has been raised, the voltage between both ends of the constant current source 14 is also elevated, as a result, the switching level of the switching circuit level becomes higher and the exposure time is increased by an amount or interval corresponding to the reducing of the iris aperture.

In the embodiment of FIG. 1, the movable contact piece 8 of the variable resistor 7, for determining the switching level of the control circuit, is moved by interlocking it with the iris setting part, but another setting part for setting some other exposure factor, for example, of the film sensitivity, exposure multiple, or their combination may be connected to the movable contact 8.

Figure 2:
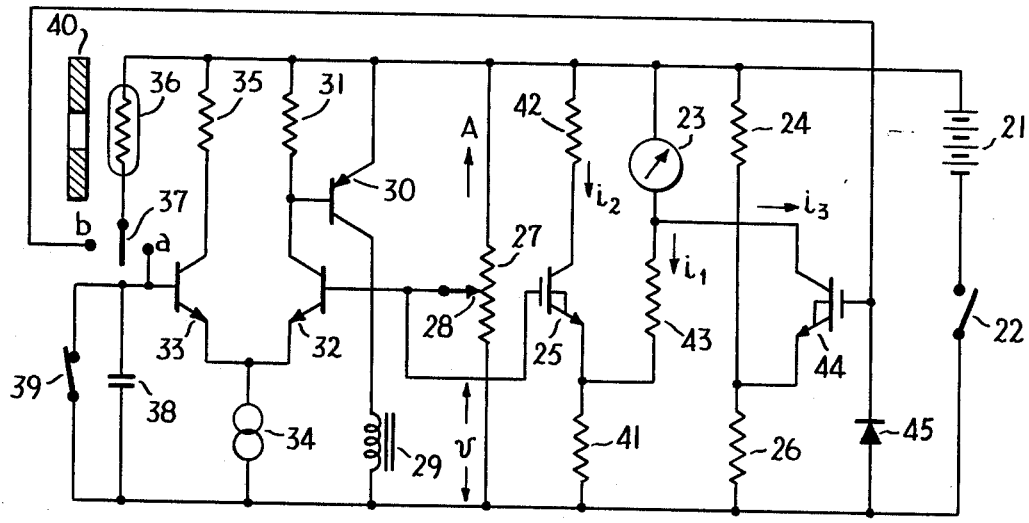

A second embodiment, shown in FIG. 2, is constituted so as to make a meter respond sufficiently to the intensity of light in a wide range, wherein a current flowing through a photoconductive element is logarithmically compressed by use of a Zener diode, the voltage logarithmically compressed is taken out by use of another electric field effect transistor, and by combining a current controlled by a bias voltage for determining the switching level of a control circuit, a meter is made to deflect to indicate the exposure time.

The embodiment in FIG. 2 has a different configuration than that of the circuitry of FIG. 1. In this instance many of the elements, i.e. 23–39, corresponding to those in FIG. 1 have the last reference numeral the same as the corresponding part in FIG. 1 preceded by a reference numeral 2 or 3. In order to simplify the description those similar parts need not be enumerated since their connections are the same as in FIG. 1. The indicating circuit is different. Two resistors 24, 26 are connected in series across a power source 21. Instead of one field effect transistor there are two electric field effect transistors 25, 44. Two resistors 41, 42 connect one field effect transistor 25 across the power source. An ammeter 23 has a series resistor 43 connected thereto and this resistor is connected to a connecting point between the one field effect transistor 25 and its series resistor 41. The other field effect transistor 44 has its source connected to the connecting point between the voltage-dividing resistors 24, 26 whereby a definite bias voltage is applied to its source.

The delay circuit is somewhat different in this circuit. A light-receiving iris 40, that moves by interlocking with an iris mounted on the exposure opening, now shown, is arranged in front of a photoconductive element 36. The change-over switch 37 has a fixed contact $b$ for placing the photoconductive element 36 in series with a Zener diode 45 connected to the negative terminal of the power source 21 when a main power switch 22 is closed. The second field effect transistor 44 is connected to this diode and its drain is directly connected to the indicating meter 23.

The other fixed contact $a$ of the change-over switch is connected to the base of a transistor 33 of the differential amplifier. The differential amplifier is further modified in that another transistor 30 which is used for amplification has its base connected to the collector of another transistor 32 of the differential amplifier. The collector of the amplifying transistor 30 is connected to an electromagnet 29.

A variable resistor 27 has its movable contact connected for applying a bias voltage to the differential amplifier. It is in this embodiment connected for varying the switching circuit level by some other exposure factor other than iris settings. Thus it may be connected mechanically to a movable part, for example, for variably setting film sensitivity by increasing or decreasing it. It may be connected to a part for setting the exposure multiple, for example. In each instance the desired setting is increased when the movable contact is moved in the direction of the arrow A.

In this embodiment the indicating circuit is composed of the two electric field effect transistors 25, 44, the Zener diode 45 and the resistors 24, 26, 41, 42, 43 and the indicating meter 23. As to the remainder of the circuitry the elements not described here are as those of the first embodiment as indicated heretofore.

The action of this second embodiment of the apparatus is as described hereinafter. When a camera release lever, not shown, is pushed down, for taking an exposure, the main switch 22 is closed, at the same time a voltage is applied to the circuit from the electric source 21, and the change-over switch 37 is turned to the fixed contact pin b. The photoconductive element 30 is illuminated by an external light controlled by the light-receiving iris 40 that is interlocked with the iris setting part, now shown, the resistance thereof is converted into a voltage logarithmically compressed by the Zener diode 45, which is impressed on the gate of the electric field effect transistor 44, making a drain current $i_3$ flow. Since, in this case, the change of resistance value of the photoconductive element 36, due to the external light, is converted into the voltage logarithmically compressed by the Zener diode 45, the gate voltage of the electric field effect transistor 44 changes linearly for the logarithmical change of external light, and as a drain current $i_3$ proportional to the gate voltage flows, too, the deflection angle of the meter 23 changes also linearly and is able to respond to the variation of light of a wide range.

Further, a current $i_1$ inversely proportional to the drain current $i_3$ flows through the meter 23 due to the fact that the bias voltage v of transistor 32 of the differential amplifier is impressed on the gate of the electric field effect transistor 32. Accordingly, in the meter 23 there flows the current $i_1$ inversely proportional to the switching level of the differential amplifier in addition to the current $i_3$ controlled by the photoconductive element 36. In other words, the current $i_3$ that is controlled by an iris factor due to the iris 40 controlled by the external light and the iris setting part, and the current $i_1$ that is controlled by factors of the film sensitivity and exposure multiple due to the bias voltage v controlled by film sensitivity and exposure multiple, flow through the meter 23, thereby the exposure time is indicated.

As the release lever moves farther the change-over switch 37 is turned to the fixed contact point a. The base of a transistor 33 is given a reverse bias by a timing switch 39 to become non-conductive, while the transistor 32 is in a conductive state; consequently the transistor 30 also becomes conductive, exciting the electromagnet 29 and locking a shutter-closing part, not shown. When the shutter blade opens mechanically, the timing switch 39 is opened and a capacitor 38 is charged, and when the charging amount reaches a certain definite level, the transistor 33 becomes conductive, the transistors 32, 30 become non-conductive, the electromagnet is demagnetized, releasing the blade closing part to close the blade, thus the exposure is finished.

In the embodiments of FIG. 1 and FIG. 2, the shutter exposure controlling circuit is made to act for indicating the exposure time by the meter. Consequently, as the amount of current flowing from the electric source 1 or 21 is large, the electric source voltage is lowered, the current flowing through the meter is decreased, making it impossible to give a correct exposure time to the meter to indicate. When the ambient temperature is lowered, the exposure time indication is remarkably accurate.

In a third embodiment illustrated in FIG. 3 the components 53–75, except as later explained, are connected in a circuit configuration similar to the circuit components 23–45 of the embodiment in FIG. 2. Instead of the power sources 21 and main switch 22 configuration of the embodiment in FIG. 1 this circuit has a power source 51 and a main or power switch 52 across which are connected two series resistors 76, 77. Three transistors 78, 79, 80 and a resistor 81 connected to the base of the transistor 79 are connected in two parallel branches in parallel with the other two resistors. The one transistor 79 has its collector connected to a connecting point between the two other transistors as shown and one other transistor 80 of the three has its base connected to a connecting point between the two series resistors 76, 77.

This last-described circuit of resistors 76, 77, 81 of transistors 78, 79 and 80 is a circuit of definite and constant voltage whereby a definite voltage is applied from the emitter of one of the transistors constituting an output transistor 78. The emitter voltage of the output transistor is kept constant regardless of the variations of the power source 51 and accordingly it is possible to make the meter indicate the exposure time correctly.

A fourth embodiment of the invention is illustrated in FIG. 4. This embodiment is similar to that in FIG. 3. In this instance the components 94–114 correspond with the elements 54–74 of the third embodiment. A power source 91 and main switch 92 correspond to the power source 51 and main switch 52. However, there are some circuit modifications. Two capacitors 116, 117 and corresponding switches 118, 119 and 120, 121 are added to this circuit and connected as shown. These additional switches are normally open and are interlocked with a change-over switch 107. When the movable contact contacts the fixed contact b all these four switches are closed and when the movable contact of the change-over switch is in contact with the other fixed contact a they are opened. Since the two switches 118, 119 are closed the capacitor 116 is charged by a bias voltage v of the controlling circuit and the other capacitor 117 is charged by the voltage occurring at both ends of a Zener diode 115 because the switches 120, 121 are closed.

What I claim and desire to secure by Letters Patent is:

1. A device for controlling an electric camera shutter comprising, circuit means comprising a photo-responsive element and capacitor charged under the control of said photo-responsive element for developing a switching signal in dependence upon the brightness of an object being photographed, a switching circuit receiving the switching signal for controlling a camera shutter, time control means comprising a variable resistor varied in accordance with the value of an exposure factor other than brightness connected for varying a switching level of said switching circuit in accordance with said exposure factor, an exposure time indicating circuit for indicating visually the exposure time necessary for compensating for the brightness level and said exposure factor being taken into consideration, a change-over switch for connecting the photoconductive element to said exposure time indicating circuit, said exposure time indicating circuit comprising a field effect transistor having a gate connected to said variable resistor and having an input impedance substantially greater than said maximum resistance value whereby said circuit means for developing the switching signal is independent of said exposure time indicating circuit as a result of the high impedance of said field effect transistor.

2. A device according to claim 1, wherein said exposure time indicating circuit further comprises meter means connected across the source and drain of said field effect transistor.

3. A device according to claim 1, wherein said exposure time indicating circuit further comprises means to enlarge the range of said exposure time indicating circuit.

4. An exposure time indicating device for a photographic camera having an electronic shutter comprising, an RC delay circuit comprising a light-responsive element and a capacitor charged under the control of said photo-responsive element for developing a switching signal in dependance upon the brightness of an object being photographed; a switching circuit connected to said RC delay circuit for controlling exposure time of the electronic shutter; a variable resistor for establishing an exposure factor other than brightness connected for determining a switching level of said switching circuit; an exposure time indicating circuit including a first field effect transistor, a second field effect transistor and a meter, a first switch, said first field effect transistor having a gate electrode connected to a slide point of said variable resistor through said first switch, a first memory capacitor connected to said gate electrode of said first field effect transistor; said first memory capacitor being connected for memorizing the switching level, a second switch connected to said first memory capacitor; said first and second switch being open during exposure; a third switch, a change-over switch means for changing over said light-responsive element from said RC delay circuit to said second field effect transistor through said third switch; a second memory capacitor connected to a gate electrode of said second field effect transistor; said second memory capacitor being connected for memorizing the impedance of said light-responsive element; a fourth switch connected to said second memory capacitor; said third and fourth switch being open during an exposure; said meter being connected for control thereof by current influenced by both the impedance of said first field effect transistor which is varied by said switching level of said switching circuit and the impedance of said second field effect transistor which is varied by the impedance of said light-responsive element; and said meter having said current applied thereto during exposure.

* * * * *